(12) United States Patent
Zech et al.

(10) Patent No.: US 6,484,663 B2
(45) Date of Patent: *Nov. 26, 2002

(54) POINTER INSTRUMENT

(75) Inventors: Stephan Zech, Eltville (DE); Bernd Ludewig, Hirschberg (DE); Gerhard Friepes, Bad Nauheim (DE); Hermann Haas, Amorbach (DE)

(73) Assignee: Mannesmann VDO AG, Frankfurt (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/425,844

(22) Filed: Oct. 21, 1999

(65) Prior Publication Data

US 2002/0108554 A1 Aug. 15, 2002

(30) Foreign Application Priority Data

Oct. 26, 1998 (DE) .......................... 198 49 161

(51) Int. Cl.⁷ .................. B60K 35/00; G01D 11/02
(52) U.S. Cl. ............... 116/284; 116/62.1; 116/62.4
(58) Field of Search ............... 116/62.1, 62.3, 116/62.4, 284–305; 73/182

(56) References Cited

U.S. PATENT DOCUMENTS

| | | | | |
|---|---|---|---|---|
| 2,174,608 A | * | 10/1939 | Vail ............... | 116/292 |
| 2,277,699 A | * | 3/1942 | Guibert et al. ...... | 116/291 |
| 2,842,091 A | * | 7/1958 | Kennedy ............ | 116/292 |
| 3,327,678 A | * | 6/1967 | Jullien-Davin ...... | 116/289 |
| 3,453,883 A | * | 7/1969 | Caggia ............. | 73/182 |
| 3,480,861 A |   | 11/1969 | Possati ............ | 324/99 R |
| 3,691,987 A | * | 9/1972 | Strock ............. | 116/289 |
| 3,915,007 A | * | 10/1975 | Johanson et al. .... | 73/387 |
| 4,020,787 A | * | 5/1977 | Castro et al. ...... | 116/300 |
| 4,194,587 A | * | 3/1980 | Shino et al. ....... | 116/62.4 |
| 4,473,304 A | * | 9/1984 | Ketner ............. | 368/281 |
| 4,507,959 A | * | 4/1985 | Brazener ........... | 72/182 |
| 4,579,460 A | * | 4/1986 | Shannon ............ | 368/27 |
| 5,201,277 A | * | 4/1993 | Aoki et al. ........ | 116/286 |
| 5,259,333 A | * | 11/1993 | Iino et al. ........ | 116/286 |

FOREIGN PATENT DOCUMENTS

| | | | |
|---|---|---|---|
| DE | 2341260 | 2/1975 | |
| DE | 4334646 | 9/1994 | |
| DE | 4403619 | 8/1995 | |
| DE | 4403620 | 8/1995 | |
| DE | 19500668 A1 * | 7/1996 | ........... B60K/35/00 |
| DE | 29722676 U1 * | 3/1998 | |
| EP | 0997338 A2 * | 5/2000 | ........... B60K/35/00 |
| GB | 519346 | 4/1939 | |
| JP | 2002036911 A * | 2/2002 | ........... B60K/35/00 |
| WO | 9740347 | 10/1997 | |

* cited by examiner

Primary Examiner—Diego Gutierrez
Assistant Examiner—R. Alexander Smith
(74) Attorney, Agent, or Firm—Martin A. Farber

(57) ABSTRACT

In a pointer instrument (1), a pointer drive (3) is used to deflect a pointer (4) arranged on a supporting element (2). The supporting element (2) is shaped essentially like a circular ring and is mounted by bearing points (7) equally distributed over its circumference. The central area of the pointer instrument (1) is therefore free of apertures and, as a result, permits the arrangement of a display (9), for example an LCD display, which can be read irrespective of the angular position of the pointer (4).

14 Claims, 3 Drawing Sheets

POINTER INSTRUMENT

FIELD AND BACKGROUND OF THE INVENTION

The invention relates to a pointer instrument, especially for a motor vehicle, having a pointer drive for deflecting a pointer and having a scale, it being possible for measured values to be displayed on the scale by the pointer.

Pointer instruments of the above type are used, for example, as tachometers or speedometers in today's motor vehicles. For improved legibility, it is desirable for the pointer instrument to have as large a diameter as possible. The disadvantage here is that the inner region, enclosed by a scale, is swept over by a pointer flag and is therefore available only to a limited extent for further displays, since the pointer flag covers different areas, depending on the angular position. In addition, it is disadvantageous that a pointer shaft deflecting the pointer flag pierces the central area of the pointer instrument. In the case of the use of large-area LCD displays in particular, the aperture required for the pointer shaft is associated with considerable production problems.

Embodiments of pointer instruments are also known in which a central aperture for the pointer shaft is avoided in that the pointer flag is of double bent-over design and is thus firstly led along in a central area behind the display and is visible to the viewer only in the edge region of the pointer instrument. Such embodiments necessitate relatively long pointers and lead to considerable pointer weights. Because of the counterweight necessary to balance the masses, this weight is often so high on that side of the pointer shaft facing the pointer that the torque of current measuring mechanisms is no longer adequate to move the pointer quickly enough or to move it at all. If a smaller cross section is selected for the pointer, in order to design the latter to be lighter, then as a result of vibrations, such as are unavoidable in a motor vehicle, for example, the pointer also starts to vibrate, which makes it more difficult to read the pointer instrument, gives an impression of lower quality and also gives rise to the risk of the pointer jamming.

SUMMARY OF THE INVENTION

The invention is based on the problem of configuring a pointer instrument of the type mentioned at the beginning in such a way that vibration can be avoided and, at the same time, the central area of the instrument can be used for further displays. At the same time, the legibility is not to be hampered by a pointer pivoted over the display.

According to the invention, this problem is solved by the pointer being arranged on a supporting element which can be deflected by the pointer drive and which has a decentral mounting. The off-center mounting makes it possible to dispense with a central pointer shaft or axle and nevertheless to achieve the usual, circular pivoting movement. The central area enclosed by the movement path of the pointer can therefore be designed to be free of apertures, so that, in particular, large-area displays, such as LCD displays, can be arranged there without problems. At the same time, the pointer drive can be arranged alongside the supporting element, which permits a flat design to be achieved. The mounting can be arranged in a plane common with the plane of the pointer or of the supporting element, which means that a tilting moment can be avoided and the sensitivity to vibration can be reduced. In this case, the supporting element can additionally have a central guide not passing through the plane of a dial or the display.

Particularly beneficial in this case is an embodiment of the invention in which the mounting has three bearing points distributed approximately uniformly over the circumference of the supporting element. By this means, exact guidance of the supporting element can be achieved, it being possible for the movement path of the supporting element to be of circular design. These bearing points can, for example, also be prestressed with respect to the supporting element, in order in this way to compensate for possible tolerances.

It is also advantageous in this case if one of the three bearing points is at the same time connected to the pointer drive. By this means, one bearing point can be saved, by the pointer drive simultaneously also assuming the function of a bearing point. By this means, the production outlay and the necessary installation space may be reduced.

A development of the invention is particularly advantageous in that the pointer drive has a means for deflecting the supporting element in a force-transmitting manner. By this means, the deflection can be carried out without problems by means of a friction wheel which belongs to the pointer drive and is prestressed against the supporting element. The supporting element can have a largely freely selectable geometry in this case.

Another advantageous embodiment of the invention is provided if the pointer drive has a means for deflecting the supporting element in a positive manner. Additional detection of the position, by means of which equalization between the actual value and the desired value is carried out, is not necessary in this case. A pointer instrument known per se can be used with a stepping motor, so that the effort on assembly may be reduced.

In this arrangement, it is beneficial if the pointer drive has a gearwheel engaging in the supporting element. By this means, a simple and at the same time reliable transmission of force may be achieved. The drive forces required to deflect the supporting element can be transmitted without problems in this case, because of the comparatively low friction.

To this end, it is particularly advantageous if the pointer drive engages at the circumference of the supporting element. As a result, the pointer drive can be arranged directly on the outside of the supporting element, it being possible in particular for these two also to be arranged in a common plane. The pointer instrument can therefore have an overall height which is only low. The pointer drive can also be arranged in an edge area of the circumference which is set back with respect to the visible area of the supporting element, by which means an appropriate optical appearance is achieved. In particular, the pointer drive remains invisible to the viewer.

Another advantageous embodiment of the invention is provided by the pointer drive engaging in the supporting element on a side thereof facing away from the viewer. To this end, the pointer drive can, for example, also be equipped with a bevel gear and can be arranged in a rear area of the supporting element. In this case, the pointer drive is covered by the supporting element and is thus arranged outside the area which is visible to the viewer. The area of the pointer instrument which is available can therefore be used optimally, right up to the edge areas. At the same time, a number of concentric supporting elements are also conceivable, each being deflectable by a separate pointer drive.

A particularly advantageous development of the invention is provided if the supporting element has an essentially central aperture. This aperture permits an unimpeded view of an additional display located behind. This display can also be arranged in a common plane with the supporting element or can protrude with respect to the supporting element. Another possibility is also the arrangement of an aperture which, depending on the pointer position, exposes a specific display located behind, in order in this way to emphasize the fact that a specific pointer position has been reached, or to mask out the displays which are irrelevant for the respective pointer position.

The supporting element could have any desired surface or finish, for example even a curved surface. However, it is particularly advantageous if the supporting element is designed as an essentially flat disk. By this means, a compact shape of the display instrument can be achieved. In this case, the pointer can be pressed onto the supporting element, for example, or can be connected to the latter as a separate component. In addition to a pointer flag, the pointer can also have other shapes in this case. For example, the pointer can be designed as a strip pointer or can be provided with numbers and symbols.

To this end, the supporting element can move over a largely arbitrary movement path which, for example, can be elliptical, in order in this way to emphasize specific pointer positions optically. However, it is particularly advantageous if the supporting element is shaped essentially like a circular disk. A supporting element designed in this way makes a circular movement path of the pointer possible, which is familiar to the viewer and thus easy for him to read. In particular, the appearance of a display instrument designed in this way is unchanged by comparison with a known display instrument having a central pointer shaft. Supporting elements designed as a circular segment can also be described.

A particularly beneficial development of the invention is provided by the supporting element being a circular ring. In such a supporting element, a number of the supporting elements can be arranged concentrically and driven independently of one another, so that a large amount of information can be visualized comprehensively, even on small areas. The pointer drive can also engage, for example, in grooves or projections on the rear of the respective supporting element, in order in this way to rule out any impeding of the adjacent supporting elements.

Another, particularly advantageous embodiment of the invention is provided by the supporting element being designed to be transparent, at least in a subarea. By this means, the supporting element can be designed as a transparent disk which covers the display located underneath and which is provided with the pointer at its edge area. The supporting element can have a light injection area and thus at the same time fulfill the function of a light conductor for illuminating a scale, the pointer or other elements of the display instrument.

BRIEF DESCRIPTION OF THE DRAWINGS

The invention permits various embodiments. In order to illustrate its basic principle further, two of these embodiments are illustrated in the drawing and will be described below. In the drawings.

DETAILED DESCRIPTION OF THE PREFERRED EMBODIMENTS

Figure 1:
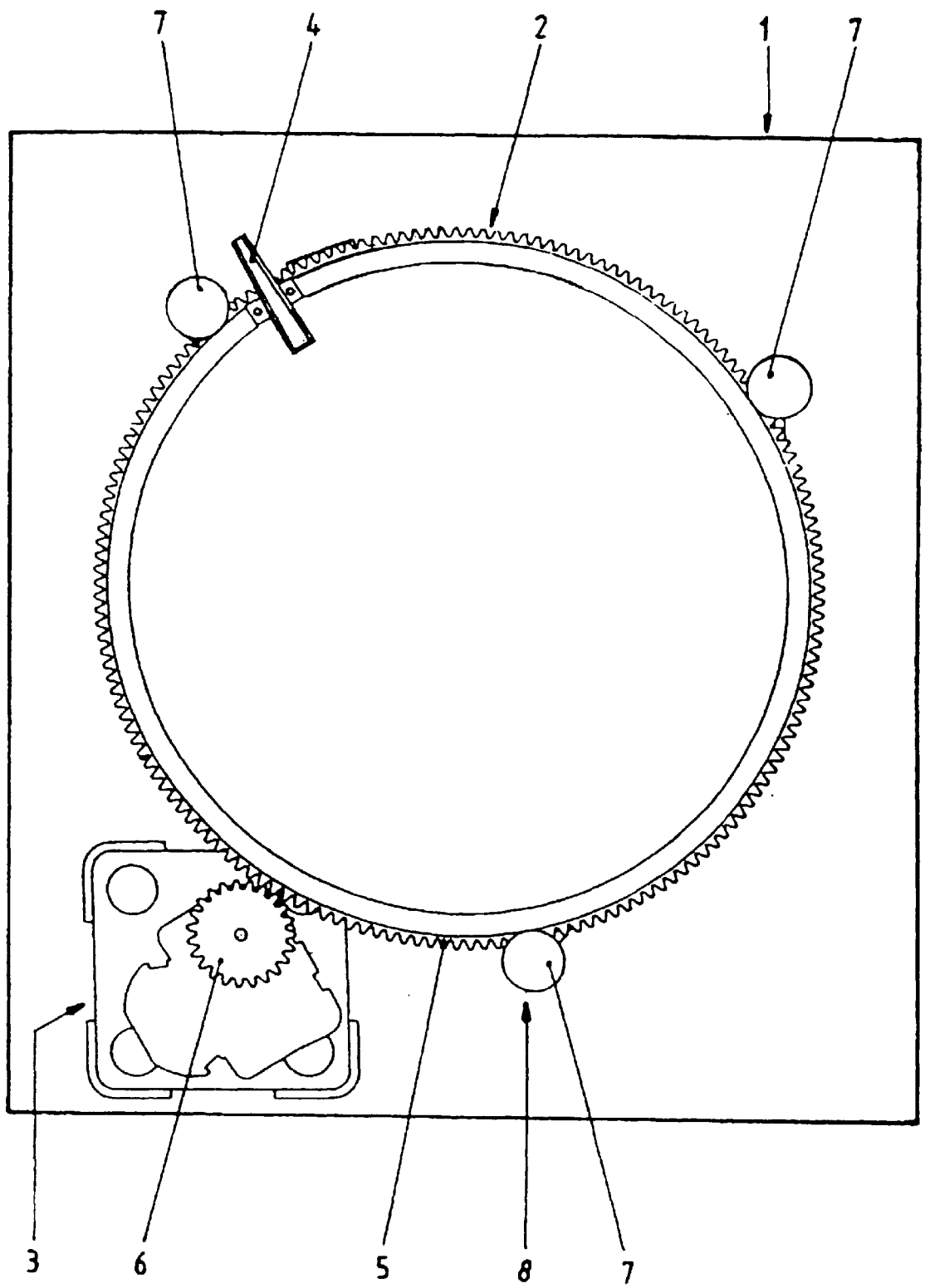
FIG. 1 shows a plan view of the pointer instrument having a supporting element and a pointer drive.

FIG. 1 shows a plan view of a pointer instrument 1 having a supporting element 2 which can be rotated by means of a pointer drive 3. When they are ready to operate, the pointer drive 3 and the supporting element 2 are covered by a covering (not illustrated for improved clarity), in particular a dial having a scale, so that only a pointer 4 connected to the supporting element 2 is visible to the viewer. The supporting element 2, which is designed as a circular ring, has on the outside a toothed rim 5, in which a gearwheel 6 of the pointer drive 3 engages. The supporting element 2 is mounted by means of a mounting 8, which comprises three bearing points 7 distributed approximately uniformly over the circumference of the supporting element 2. The inner area, cut out of the supporting element 2, is therefore free of apertures such as are unavoidable in particular for a pointer shaft in centrally mounted pointer instruments.

Figure 2:
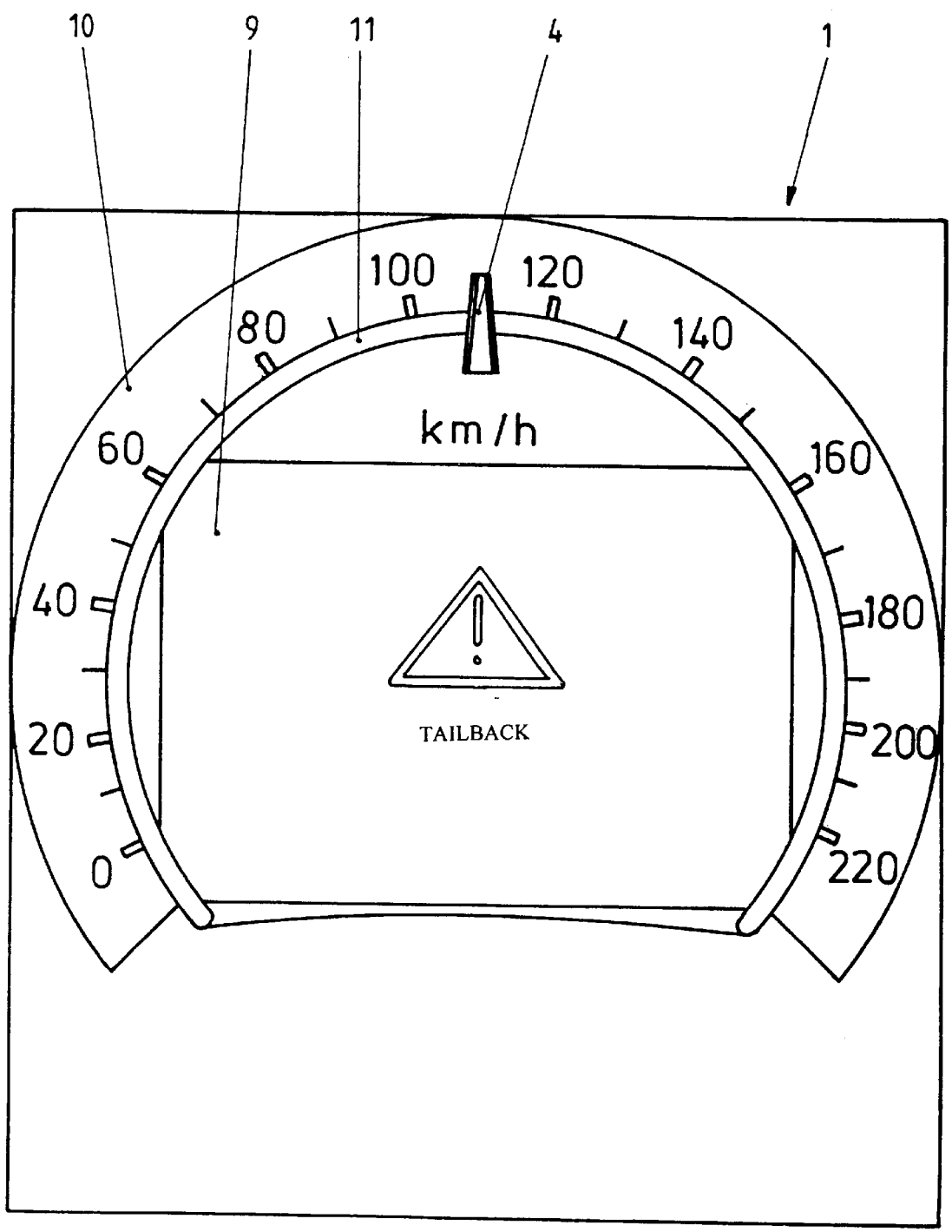
FIG. 2 shows a plan view of a pointer instrument in the operating state.

FIG. 2 shows a plan view of the pointer instrument 1 in its position ready to operate. In this case, a display 9 designed as an LCD display is arranged in the inner area, bounded by the pointer 4, of the pointer instrument 1 and, for example, is used for displaying traffic information. The display 9 remains legible irrespective of the angular position of the pointer 4, which indicates a driving speed of a motor vehicle, so that optimal use of the available space is achieved. Arranged in the same plane as the display 9 is a dial having a scale 10, over which the pointer 4 can be moved in the area of a cutout 11. Other designs, in which the pointer 4 can additionally also be pivoted in a common plane or in which the display 9 and the scale 10 are arranged in different planes, can likewise be achieved in this case.

Not illustrated is a modified embodiment in which a pointer is fitted to a supporting element shaped like a circular disk, which is designed to be transparent in the area of a central display. To this end, the supporting element can also have a central axle or shaft as a guide, which does not need to pass through the display for this purpose.

Figure 3:
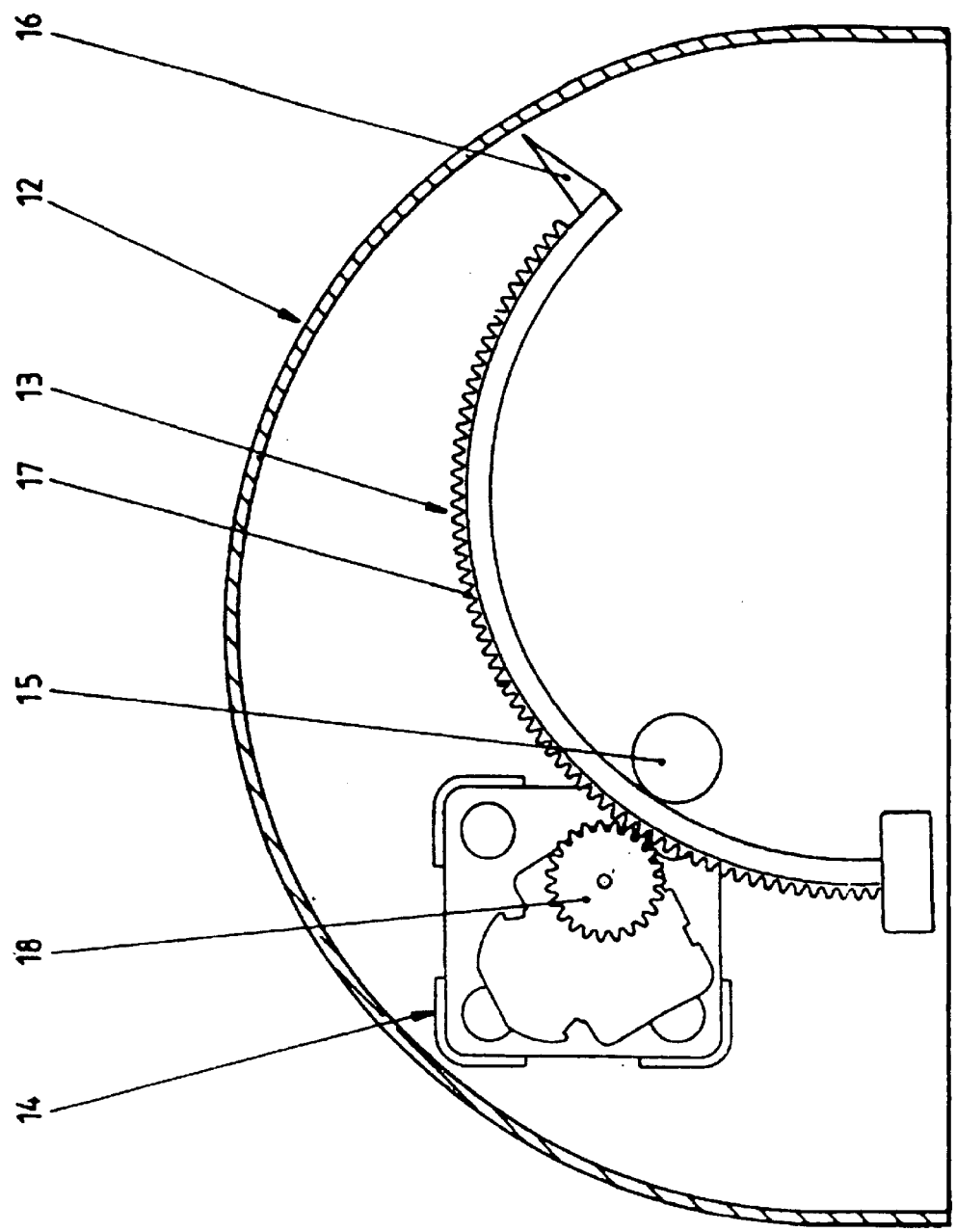
FIG. 3 shows a plan view of a further pointer instrument.

FIG. 3 shows a simple embodiment of a further pointer instrument 12. In this case, a supporting element 13 is arranged between a pointer drive 14 and a bearing point 15 such that it can move, a pointer 16 arranged on the supporting element 13 executing an essentially circular pivoting movement. The supporting element 13 has a row of teeth 17 on the outside, in which a gearwheel 18 of the pointer drive 14 engages. The latter is designed as a stepping motor, so that additional zero-point compensation can be dispensed with. The supporting element 13 can also have a largely arbitrary shape and thus permits a movement path which can be adapted to the individual use. Likewise, the forward drive of the supporting element 13, applied by means of the pointer drive 14, can be different, depending on the deflection angle, and can thus permit a different scaling in a predetermined area.

We claim:

1. A pointer instrument, for a motor vehicle, comprising a pointer,
a decentrally mounted pointer drive for operatively rotatably deflecting the pointer,
a scale over which the pointer is movable for indicating measured values,
an annular supporting element, wherein the pointer (4, 16) is arranged on the supporting element (2, 13), and wherein
the supporting element being rotatably deflectable by the pointer drive (3, 14) and having with the pointer a decentral mounting (8), and wherein
the supporting element defines an essentially central aperture without there being any other apertures in the pointer instrument within said aperture, or the supporting element is transparent, at least in a sub-area of the supporting element, and wherein a display capable of displaying traffic information is located in and behind said aperture or said sub-area.

2. The pointer instrument as claimed in claim 1, wherein the mounting (8) has three bearing points (7) distributed approximately uniformly over the circumference of the supporting element (2).

3. The pointer instrument as claimed in claim 2, wherein one of the three bearing points (3) is at the same time connected to the pointer drive (3).

4. The pointer instrument as claimed in claim 1, wherein the pointer drive (3, 14) has a means for deflecting the supporting element (2, 13) in a force-transmitting manner.

5. The pointer instrument as claimed in claim 1, wherein the pointer drive (3, 14) has a means for deflecting the supporting element (2, 13) by a complementary shape of the means and the supporting element.

6. The pointer instrument as claimed in claim 1, wherein the pointer drive (3, 14) has a gearwheel (6, 18) engaging the supporting element (2, 13).

7. The pointer instrument as claimed in claim 1, wherein the pointer drive (3, 14) engages at the circumference of the supporting element (2, 13).

8. The pointer instrument as claimed in claim 1, wherein the pointer drive (3, 14) engages the supporting element (2, 13) on a side thereof facing away from the viewer.

9. The pointer instrument as claimed in claim 1, wherein the supporting element (2, 13) is a circular ring.

10. The pointer instrument as claimed in claim 1, wherein said display is arranged in substantially a common plane with said scale.

11. The pointer instrument as claimed in claim 1, wherein said supporting element has an annular shape.

12. A pointer instrument, for a motor vehicle, comprising a pointer, a decentrally mounted pointer drive for operatively rotatably deflecting the pointer, a scale over which the pointer is movable for indicating measured values constituting a display, a supporting element defining a central region, wherein the pointer (4, 16) is arranged on the supporting element (2, 13) outside the central region, and wherein the supporting element being rotatably deflectable by the pointer drive (3, 14) and having with the pointer a decentral mounting (8), and wherein the supporting element is transparent, at least in a sub-area substantially in the central region, and wherein an additional display capable of displaying traffic information is located in and behind said sub-area.

13. The pointer instrument as claimed in claim 12, wherein the supporting element (2, 13) is an essentially transparent flat disk which covers the additional display underneath.

14. The pointer instrument as claimed in claim 12, wherein the supporting element (2, 13) is shaped essentially as a transparent circular disk which covers the additional display underneath.

* * * * *